No. 850,749. PATENTED APR. 16, 1907.
G. W. HAMMERS.
GANG PLOW.
APPLICATION FILED OCT. 5, 1906.

3 SHEETS—SHEET 1.

WITNESSES:

George W. Hammers INVENTOR.

By

ATTORNEYS

No. 850,749. PATENTED APR. 16, 1907.
G. W. HAMMERS.
GANG PLOW.
APPLICATION FILED OCT. 5, 1906.

3 SHEETS—SHEET 2.

WITNESSES:

GeorgeW.Hammers INVENTOR

By C.A.Snow&Co
ATTORNEYS

No. 850,749. PATENTED APR. 16, 1907.
G. W. HAMMERS.
GANG PLOW.
APPLICATION FILED OCT. 5, 1906.
3 SHEETS—SHEET 3.
Fig. 3.
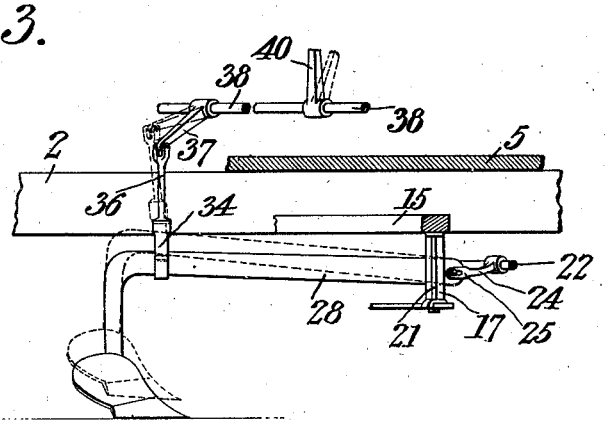
Fig. 4.
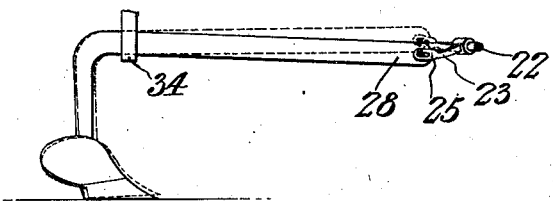
Fig. 5.             Fig. 6.             Fig. 7.
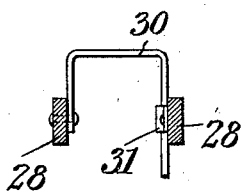    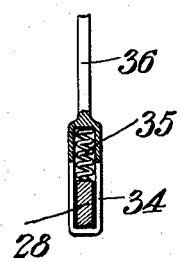    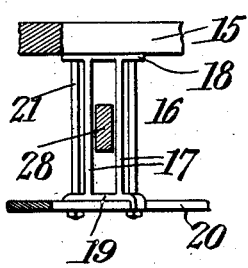
WITNESSES:  George W. Hammers  INVENTOR
            By  C. A. Snow & Co.
                ATTORNEYS

UNITED STATES PATENT OFFICE.

GEORGE W. HAMMERS, OF LA JUNTA, COLORADO.

GANG-PLOW.

No. 850,749.      Specification of Letters Patent.      Patented April 16, 1907.

Application filed October 5, 1906. Serial No. 337,605.

*To all whom it may concern:*

Be it known that I, GEORGE W. HAMMERS, a citizen of the United States, residing at La Junta, in the county of Otero and State of Colorado, have invented a new and useful Gang-Plow, of which the following is a specification.

This invention relates to gang-plows; and its object is to provide a durable and compact machine of this character having the plow-beams so mounted as to be capable of independent vertical movement.

A still further object is to provide plow-beams which are incapable of moving laterally within the frame of the plow and which can be simultaneously adjusted to regulate the incline of the shares and the depth of the cut.

Another object is to provide means whereby the plow beams and shares can be quickly raised and lowered simultaneously by means of motive fluid adapted to be directed from the traction-engine to be used in connection with the plow.

A still further object is to provide simple means for adjusting the frame of the plow toward or from the ground.

With the above and other objects in view the invention consists of certain novel features of construction and combinations of parts, which will be hereinafter more fully described, and pointed out in the claims.

In the accompanying drawings is shown the preferred form of the invention.

Figure 1:
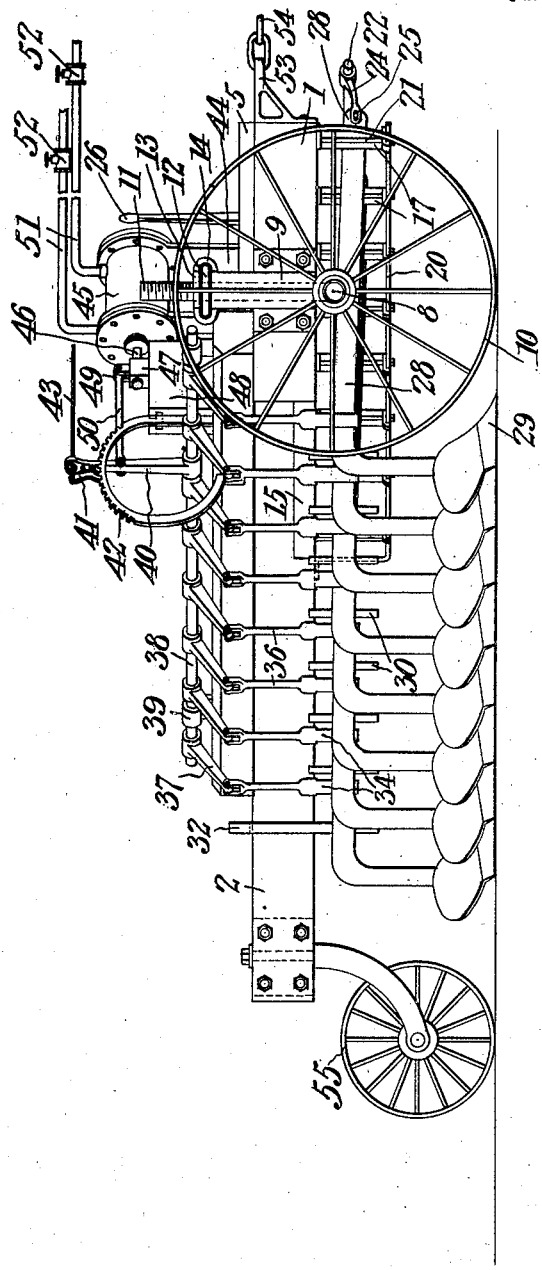
Figure 2:
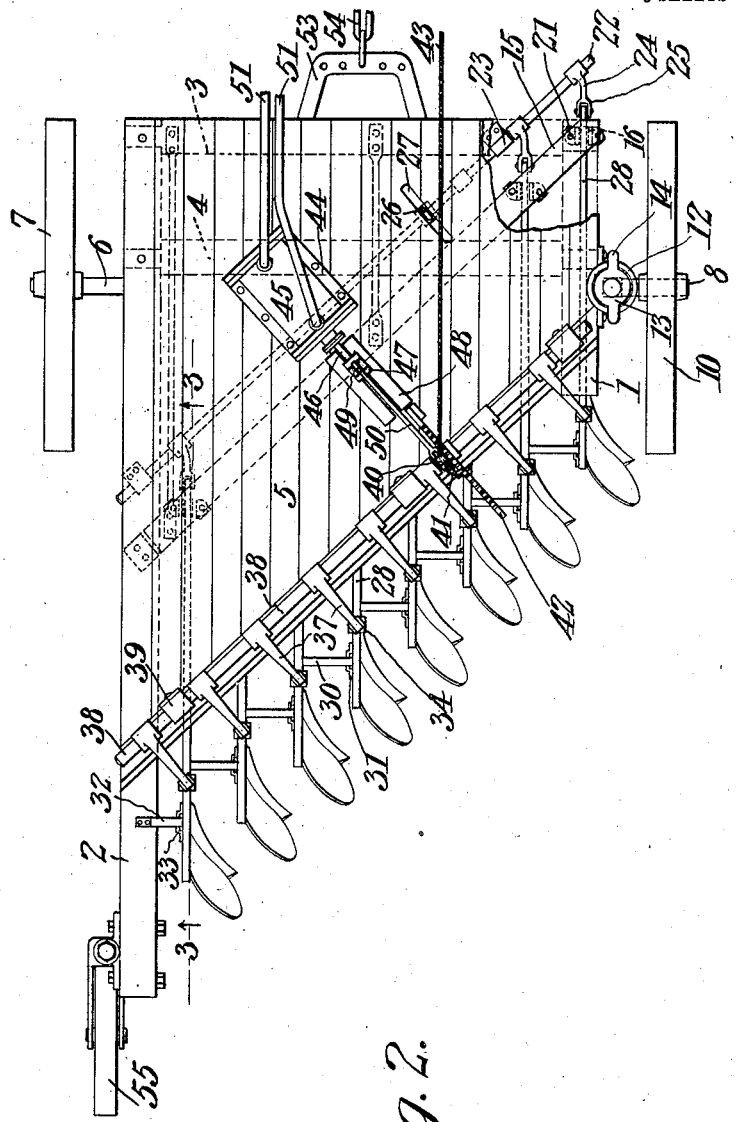

In said drawings, Figure 1 is a side elevation of a gang-plow constructed in accordance with the present invention. Fig. 2 is a plan view thereof, a portion of the platform being removed. Fig. 3 is a section on line 3 3, Fig. 2, and showing by dotted lines the position of a plow when raised from the ground. Fig. 4 is a detail view of a plow-beam and showing by dotted lines a position assumed thereby when the shares are adjusted in relation to the ground. Fig. 5 is a transverse section through two plow-beams and showing the yoke connection therebetween. Fig. 6 is a view, partly in section and partly in rear elevation, of the rear guide and lifting device of one of the plow-beams, said beam being shown in section; and Fig. 7 is an elevation of the front guide of one of the beams, said beam being shown in section.

Referring to the figures by characters of reference, 1 is a short side beam, and 2 is a long side beam, both beams being connected at their front portions by cross-beams 3 and 4, thereby forming a frame carrying a platform 5 of trapezoidal form. A short axle 6 extends from the long side of the frame and is supported by a traction-wheel 7, while an L-shaped axle 8 is mounted within a sleeve 9, bolted or otherwise secured to the short side of the frame and has its laterally-extending portion arranged within a furrow-wheel 10. The upper portion of the axle 8 is screw-threaded, as shown at 11, and is engaged by an adjusting-wheel 12, rotatably mounted upon the upper portion of the sleeve 9 and held in place thereon by a ring 13, which is connected to the sleeve by arms 14. By rotating this wheel 12 the axle 8 can be raised or lowered so as to adjust the wheel 10 to furrows of different depths in order to maintain the machine horizontal.

A beam 15 is arranged diagonally within the side beams 1 and 2 and parallel with the rear edge of the platform 5, and secured to this beam at regular intervals are guides 16, consisting of parallel hangers 17. These hangers 17 have integral heads 18 bolted or otherwise secured to the beam 15 and are provided with an integral base 19, adapted to straddle a diagonally-disposed connecting-strip 20, which is arranged directly under the beam 15 and is fastened thereto by means of bolts 21, located at opposite sides of each of the guides 16. A shaft 22 is journaled in suitable bearings 23, connected to the frame of the machine, and this shaft is parallel with beam 15 and has a plurality of arms 24 extending rearwardly therefrom, each arm terminating directly in front of one of the guides 16 and being forked, as shown at 25. An actuating-lever 26 extends upward from the shaft 22 and through a slot 27 in the platform and constitutes means whereby said shaft can be conveniently rocked manually.

Each fork 25 embraces and is pivotally connected to the front end of a plow-beam 28, arranged under the platform 5 and extending through the adjacent guide 16. A plowshare 29 is connected to the rear portion of this beam in the usual manner, and as all of the beams 28 are of the same length it will be obvious that the plowshares will be disposed in a line extending parallel with the rear diagonal edge of the platform 5. Each beam 28 has a yoke 30 secured to one side thereof adjacent its rear end, and said yoke is slidably mounted within a strap or eye 31, secured to one face of the adjoining beam 28. A yoke 32 is also secured to the side beam 2 and engages an eye 33 on the adjoining beam 28. It is therefore obvious that all of the plow-beams are capable of moving vertically and independently of one another; but the yokes 30 and 32 prevent lateral movement thereof.

The rear portion of each beam 28 extends through an elongated loop 34, and a coiled spring 35 is disposed within each loop and bears upon the beam therein, so as to exert a constant downward pressure upon the beam. These loops 34 are disposed at the lower ends of stems 36, which are pivotally connected to arms 37, secured to a shaft 38, which is journaled in bearings 39 on the platform 5 and disposed parallel with and adjacent to the rear diagonal edge of said platform. The arms are all disposed in the same plane and are adapted when the shaft is partly rotated to simultaneously raise or lower the loops 34 and cause a corresponding movement of the rear ends of the beams 28. A lever 40 is secured to the shaft 38 and carries a spring-pressed dog 41, which normally engages a toothed bar 42, secured to the platform. An operating-cord 43 is connected to the dog and is of sufficient length to permit an operator at some distance from the plow to readily disconnect the dog from the bar 42.

Mounted in suitable supports 44 on the platform 5 is a cylinder 45, having a piston therein, (not shown,) the rod 46 of which is connected to a block 47, mounted in a suitable guide 48, arranged upon the platform. This block has upstanding ears 49, which are connected to the lever by a rod 50. Pipes 51 open into the cylinder 45 adjacent the ends thereof and are adapted to be connected by flexible hose (not shown) with the boiler of a traction-engine. Each pipe has a valve 52, whereby the passage of fluid under pressure may be controlled.

A bracket 53 is secured to the front end of the frame of the gang-plow, and a chain 54 is adapted to be used for connecting the bracket with the traction-engine. A caster 55 is connected to the rear end of the beam 2 and is adapted to support the rear portion of the platform.

In use the gang-plow herein described is connected to a traction-engine by means of a short chain 54, and the pipes 51 are coupled to the boiler by means of a suitable flexible hose. When the machine is started forward, fluid under pressure is directed into the front end of the cylinder 45 so as to drive the piston and the block 47 rearwardly and cause the lever 40 to rock the shaft 38 and swing the arms 37 downward. It is of course necessary for the operator to first disengage the dog 41 from the bar 42. As soon as the parts have been adjusted in this manner the dog is released and locks the shaft 38 against further movement. As will be obvious, the plow-points are simultaneously dropped as a result of this movement of shaft 38, and the springs 35 will push them into the ground, so that as the machine moves forward a plurality of furrows will be produced. By permitting each plow to move vertically and independently of the others it is possible for the plows to ride over any unyielding obstructions which may be in the path thereof without resulting in injury to the machine. The plows may be adjusted to any desired angle to the ground by manipulating the lever 26 and rocking shaft 22. This is clearly illustrated in Fig. 4. All of the plow-points can be raised from the ground simply by releasing the dog 41 and directing fluid under pressure into the rear end of the cylinder so as to swing the arms 37 upward. The wheel 10 is adapted to ride within one of the furrows previously formed, and by rotating the wheel 12 the traction-wheel 10 can be adjusted so as to hold the frame horizontal. The guides 16 prevent the beams from twisting at the front ends thereof, and, as heretofore stated, the yokes 30 and 32 constitute effective means for preventing lateral movement of the rear ends of the beams. Considerable importance is attached to the fact that all of the beams may be raised or lowered simultaneously by means of fluid under pressure, but are at the same time capable of independent and vertical movement. Importance is also attached to the novel means for simultaneously adjusting all of the beams so as to bring the points of the plows at different angles to the ground. By providing the described mechanisms for producing these results the plow can be very easily and quickly manipulated.

What is claimed is—

1. In a gang-plow the combination with a portable frame; of a plurality of beams supported by the frame, and means operated by a fluid under pressure for simultaneously raising the beams or pressing them downward.

2. In a gang-plow the combination with a portable frame; of beams carried thereby, a spring bearing upon each beam, and fluid-operated means for simultaneously raising the beams and for simultaneously tensioning the springs to direct the beams against the ground.

3. In a gang-plow the combination with a portable frame; of a plurality of beams movably connected thereto, independent yielding means for exerting a constant downward pressure upon the beams, operating means connected to the beams, and means for directing fluid into said operating means to simultaneously raise the beams, or to simultaneously increase the tension of the yielding means to press the beams toward the ground.

4. In a gang-plow the combination with a portable frame; of a plurality of beams pivotally connected thereto, an elongated loop surrounding each beam, a spring interposed between each beam and the upper end of each loop, and means for simultaneously lifting the loops to raise the beam and for simultaneously lowering the loops to tension the springs.

5. In a gang-plow the combination with a portable frame; of a plurality of beams pivotally connected thereto, an elongated loop surrounding each beam, a spring interposed between each beam and the upper end of each loop, actuating means connected to the loops, and means for directing fluid under pressure against said means to simultaneously raise the loops and beams and to direct fluid against said means to simultaneously lower the loops to compress the springs.

6. In a gang-plow the combination with a portable frame; of a plurality of beams movably connected to the frame, a loop loosely surrounding each of the beams, a spring interposed between the upper end of each loop and the beam thereunder, a rock-shaft, arms extending therefrom, connections between the arms and loops, and fluid-operated means for rocking the shaft in either direction to simultaneously lift the loops and beams or to simultaneously lower the loops to compress the springs upon the beams.

7. In a gang-plow the combination with a portable frame; of a plurality of beams, simultaneously-adjustable pivots at the front ends of the beams, flexible guides for the beams, means for raising and lowering the rear ends of the beams in unison, each beam being movable vertically independently of the others, and means for preventing independent lateral movement of the beams.

8. In a gang-plow the combination with a portable frame having a plurality of rigid guides depending therefrom; of a beam movably mounted within each guide, adjustable pivots at the front ends of the beams, a rock-shaft, power mechanism for actuating said shaft, and means operated by the shaft for raising or lowering the rear ends of the beams in unison.

9. In a gang-plow the combination with a portable frame having a plurality of rigid guides depending therefrom; of a beam movably mounted within each guide, adjustable pivots at the front ends of the beams, a rock-shaft, power mechanism for actuating said shaft, arms extending from the shaft, loops suspended therefrom and movable therewith, one beam extending through and adapted to move vertically within each loop, and a spring within each loop and bearing upon the beam therein.

10. In a gang-plow the combination with a portable frame having a plurality of rigid guides depending therefrom; of a beam movably mounted within each guide, adjustable pivots at the front ends of the beams, a rock-sdaft, power mechanism for actuating said shaft, arms extending from the shaft, loops suspended therefrom and movable therewith, one beam extending through and adapted to move vertically within each loop, a spring within each loop and bearing upon the beam therein, an eye upon one face of each beam, and a yoke upon the other face of each beam, said yokes being movable vertically within the eyes of the adjoining beams.

11. In a gang-plow the combination with a portable frame, beams carried thereby, and means for raising or lowering the beams in unison; of a sleeve secured upon one side of the frame, a vertically-movable axle mounted within the sleeve and having a lateral extension, a traction-wheel mounted upon said extension, and an adjusting-wheel threaded upon the axle and engaging the sleeve.

12. In a gang-plow the combination with a portable frame; of a plurality of beams supported by the frame, and means operated by fluid under pressure for simultaneously pressing the beams toward the ground.

13. In a gang-plow the combination with a portable frame; of a plurality of independently-movable beams supported by the frame, separate means for imparting a constant yielding downward pressure upon each of the beams, and means operated by a fluid under pressure for simultaneously pressing the beams downward.

In testimony that I claim the foregoing as my own I have hereto affixed my signature in the presence of two witnesses.

GEORGE W. HAMMERS.

Witnesses:
  C. E. VEASIE,
  RUFUS BUCKEY.